J. L. NICHOLSON.
WATER CIRCULATING TUBE.
APPLICATION FILED FEB. 16, 1918.
1,356,307.
Patented Oct. 19, 1920.
3 SHEETS—SHEET 1.
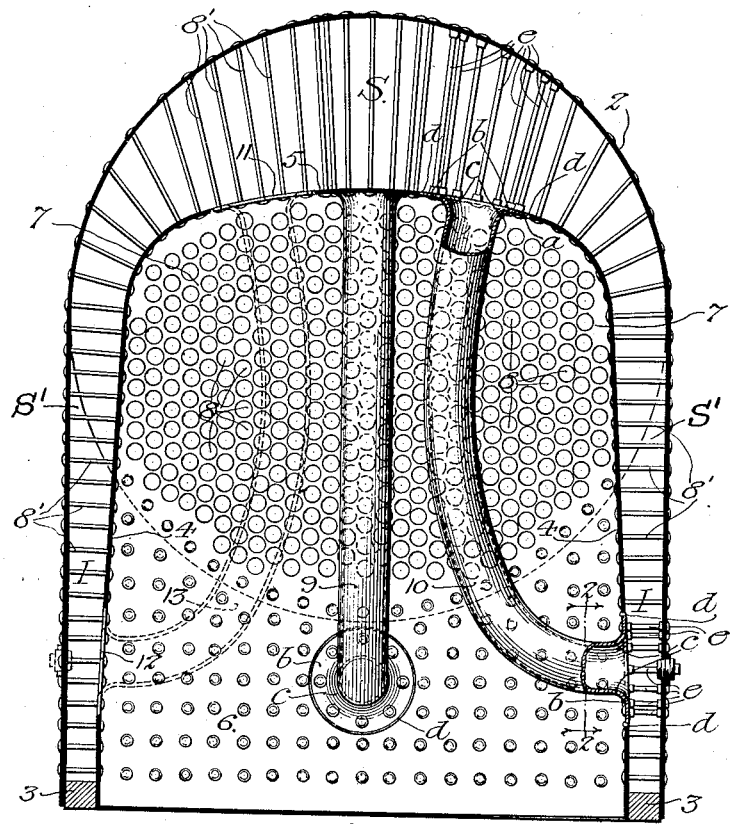
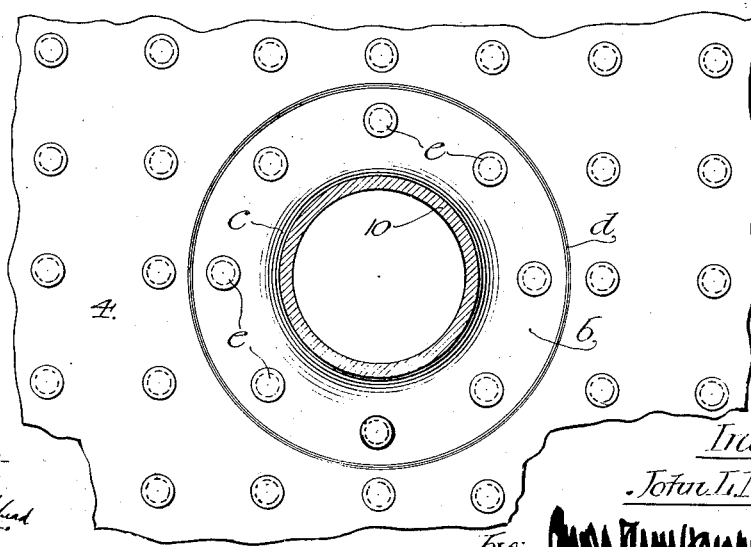

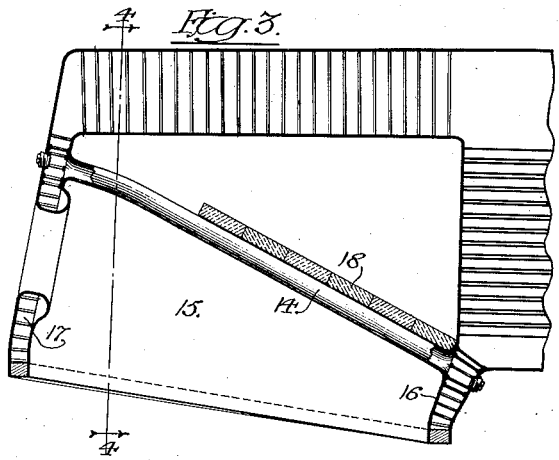
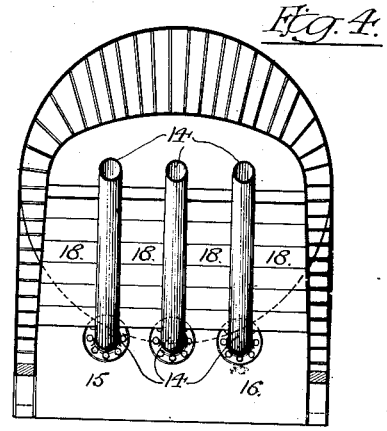
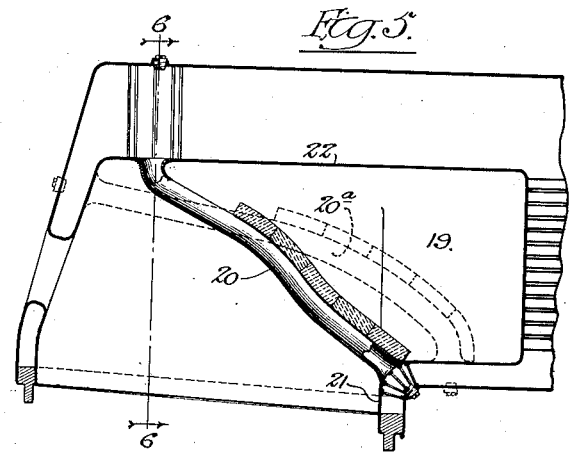
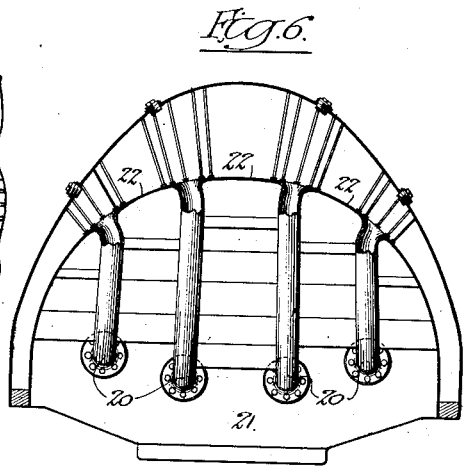
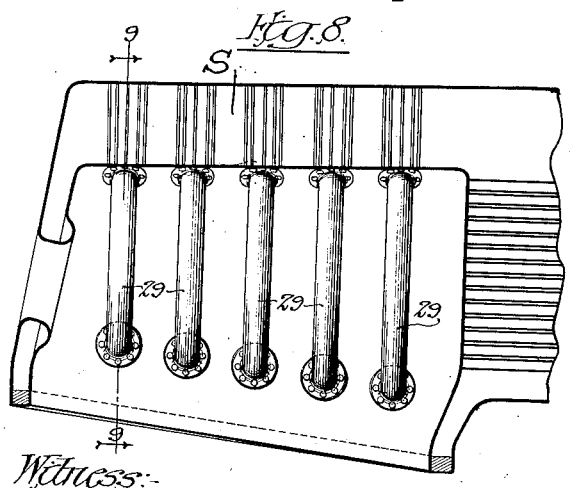
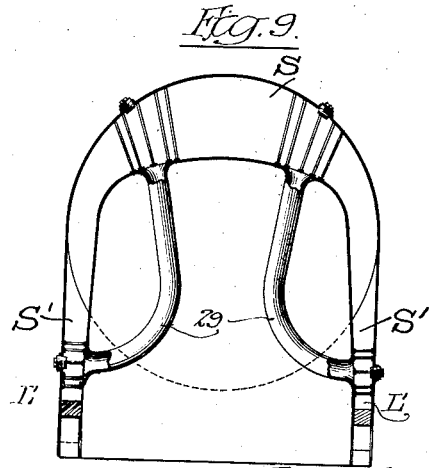

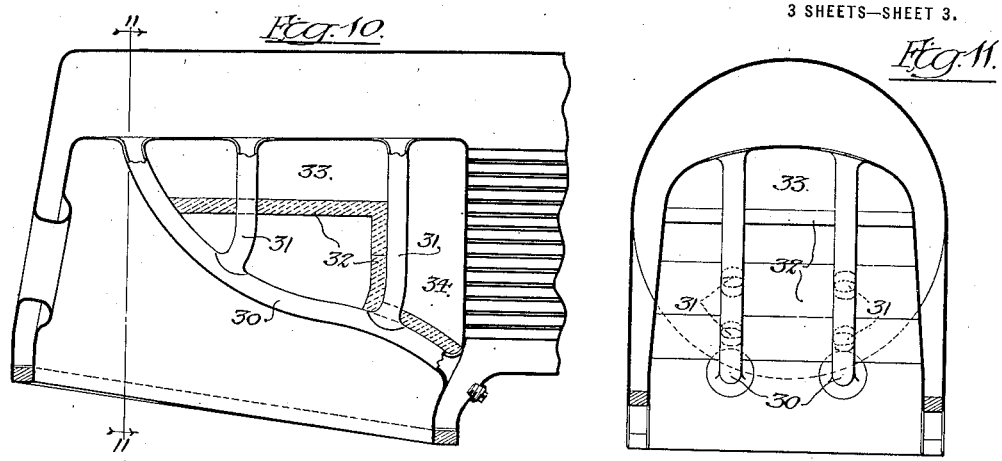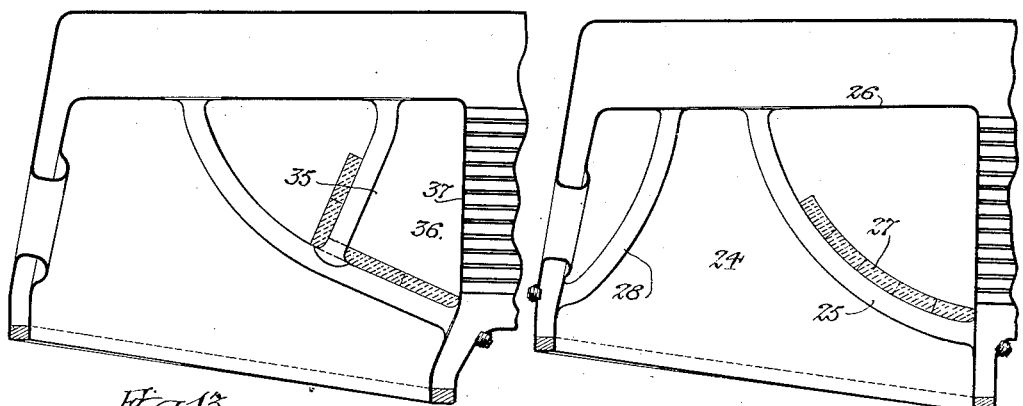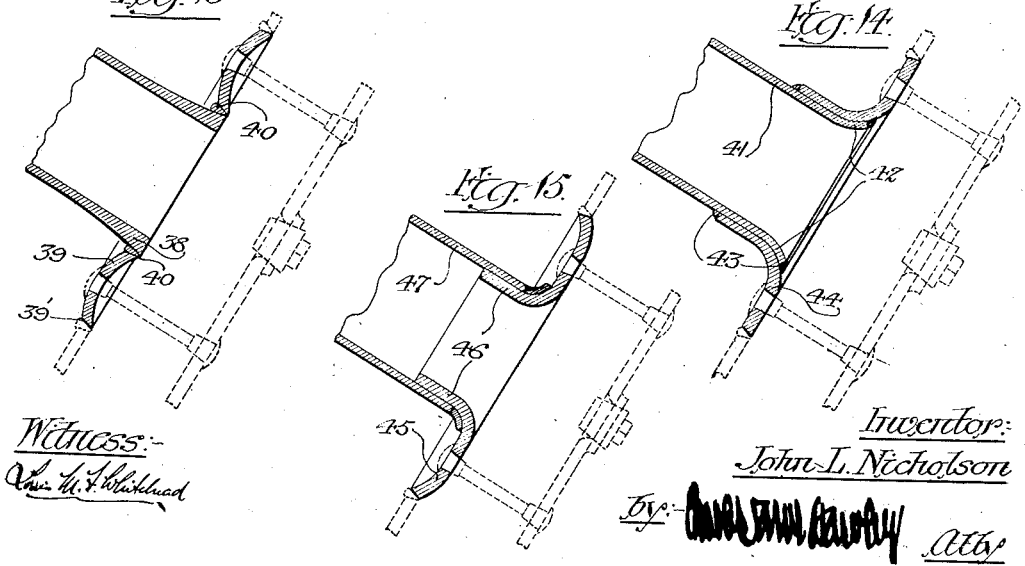

UNITED STATES PATENT OFFICE.

JOHN L. NICHOLSON, OF CHICAGO, ILLINOIS, ASSIGNOR, BY MESNE ASSIGNMENTS, TO LOCOMOTIVE FIREBOX COMPANY, A CORPORATION OF DELAWARE.

WATER-CIRCULATING TUBE.

1,356,307.	Specification of Letters Patent.	Patented Oct. 19, 1920.

Application filed February 16, 1918. Serial No. 217,703.

*To all whom it may concern:*

Be it known that I, JOHN L. NICHOLSON, a citizen of the United States, and a resident of the city of Chicago, county of Cook, and State of Illinois, have invented certain new and useful Improvements in and for Water-Circulating Tubes, of which the following is a specification.

My invention relates to improvements in the fire-boxes of the boilers of locomotives and the like; and has special reference to improvements in water-circulating tubes and ducts for use in such fireboxes.

The object of my invention is to provide first an improved water circulating tube for such uses, and, second, to provide a method and means whereby such tubes may be easily and securely united to the firebox sheets and made as durable and as safe as other parts of the fire-box. A still further purpose is to make possible and safe the use of water-circulating tubes of greater capacity than has been possible in the past.

Broadly speaking, my invention comprises a water-circulating firebox part, element or member, which extends from a low point on one of the firebox sheets to a high point in the same or another sheet of the firebox, and which has its ends united, preferably by welds, to respective sheets and also stay-bolted to adjacent parts of the boiler shell, whereby the water-circulating member becomes a truly integral or constituent member of the firebox and boiler.

The invention also embraces a water-circulating element as a new article of manufacture, separate from the firebox to which it is fitted.

To those skilled in the art it will be clear that a firebox may contain any desired number of these circulating tube elements thus safely secured and made permanent parts of the firebox. And, obviously, the presence of such elements adds greatly to the heating surface of the firebox. They further serve as foundation parts for any refractory arch which may be equired in the firebox. The cross sectional dimensions of the tubes, and the thickness of their walls, may be carried within wide ranges; for as they are strongly united to the firebox sheets and are additionally secured by stay bolts, it is obvious that they cannot be pulled out or separated from the sheets by any of the forces which render ordinary water circulating tubes unsafe and short-lived.

My invention also comprises various novel constructions, relating both to the water circulating elements and to the fireboxes as a whole, including special arches or baffles, all as hereinafter described and particularly pointed out in the appended claims.

The invention will be readily understood on reference to the accompanying drawings which form part of this specification, and in which: Figure 1 is a transverse vertical section of a typical locomotive boiler, disclosing the firebox thereof and several water-circulating elements embodying, and applied in accordance with, my invention;—Fig. 2 is an enlarged sectional detail on the line 2—2 of Fig. 1;—Fig. 3 is a vertical longitudinal section of a locomotive firebox, showing longitudinal arch tubes disposed therein in accordance with my invention;—Fig. 4 is a vertical section on the line 4—4 of Fig. 3. Fig. 5 is a longitudinal section of a Wootten type firebox containing my invention. Fig. 6 is a transverse section thereof on the line 6—6 of Fig. 5. Figs. 7, 8, 10 and 12, are other longitudinal views illustrating further applications of my invention. Fig. 9, is a section on the line 9—9 of Fig. 8;—Fig. 11, is a section on the line 11—11 of Fig. 10;—and, Figs. 13, 14, and 15, illustrate modified methods of forming stay-bolt flanges upon the water-circulating tubes.

Referring now to Fig. 1 of the drawings, the familiar parts of a typical locomotive boiler and firebox may be identified as follows: 2 is the boiler shell wrapper sheet;— 3, is the mud ring;—4, 4, the side sheets of the firebox;—5 the crown sheet of the firebox; 6 the throat sheet at the forward end of the firebox;—and, 7 the flue sheet, which may be integral with the sheet, 6, and which contains the flues, 8. The edges of the several sheets are attached to the mud ring, 3. As is customary a large number of suitably spaced stay bolts, 8, join the wrapper sheet and the firebox sheets to sustain the latter against the pressure of steam in the space, S. The narrow spaces, S', are usually referred to as the side water legs of the boiler. There is a similar water-leg adjacent the throat sheet, 6.

I have selected this vertical cross section of the boiler (Fig. 1) to serve as a diagram whereby to explain the salient features of my water-circulating system of tubes. Two such tubes are shown, being the parts marked 9 and 10, and in addition I have shown openings, 11 and 12, as though ready to receive a third tube, indicated by dotted lines 13. Each tube comprises a body portion, preferably of uniform cross section throughout, and the extreme ends of which are flared outwardly; whereby the tube is provided with the integral end flanges, $a$ and $b$. These flanges may be of identical formation and diameter, though not necessarily so. In each case the juncture $c$, between the flange and the body of the tube is formed upon a generous curve to avoid an abrupt corner or angle. I prefer that the flanges shall be as thick as the firebox sheets, 4 and 5, and when the body of the tube presents a thinner wall I upset the ends of the tube before forming the flanges $a$ and $b$. Ordinarily it will be found advantageous to use a thick walled tube, the more easily to provide flange edges of a thickness approximating that of the fire sheets; and as is well known, the body portions of the tube if too thick when placed in service, will quickly burn down to the thickness which accords with the rate of thermic transmission between the fire chamber, F, and the moving column of water in the circulating tube.

Initially the tubes are substantially straight, and one step in preparing to install them in a firebox consists in bending them to specified shapes according to the positions which they are to occupy in the firebox. The length of the tube (the distance between its end flanges, $a$ and $b$) is likewise determined by the position to be occupied and by the dimensions of the firebox. It will be understood that the bending of the tube may be done while the same is cold, but before attempting to form the integral flanges or flared ends, $a$ and $b$, those ends should be heated in a forge or furnace.

In bending a tube to fit the firebox, it is best to start the bends at an appreciable distance back of the flanges, thereby leaving the end portion substantially perpendicular to the flange in each case. I follow this rule, whenever possible, in order to avoid having to flange the tube ends upon planes which are oblique or otherwise irregular to the normal axes of its end portions. Though the latter operation is practical it is more expensive, and hence objectionable when the quantity production of the tubes is taken into consideration.

When a tube has been prepared and shaped, it is then placed in the firebox with its flanges resting in predetermined positions against the upper and lower sheets to which it is to be attached. Those sheets are then marked or scribed; the flanges of the tube at that time serving as convenient templets. Thereafter, openings are cut in the firebox sheets, the same conforming to the templet marks. Thus two openings, such as the openings, 11 and 12, are provided for the reception of the tube; and these openings, obviously, are of substantially the same size and shape as the wide flanges which they are to receive. As a next step the tube is placed in position, with respective flanges within the fire sheet openings and substantially flush with the surfaces of those portions of the fire sheets, and in each case thereafter, the sheet and the flange are welded edge to edge, as by the familiar oxy-acetylene method of welding or by a suitable electric welding process. Such welds are indicated at points, $d$. Definite marks are used to represent the welds $d$, but it will be understood that when the work is finished the welds are barely perceptible; for by that means the metal tubes are actually unified with and become integral parts of the firebox sheets.

A first advantage of this method of forming the water circulating tubes and attaching them to the firebox walls, arises from the spacing between the weld portion and the body of the tube whereby the circular weld even though relatively weak, by reason of its distant leverages is adapted to resist the twisting and distorting strains which may be exerted at the tube ends due to expansion or contraction, or the warping of the body of the tube or the bending or yielding thereof under an excessive load, as under the weight of a fire arch or baffle.

There will be many cases in which it will be safe to rely upon these flanges and widely spaced welds as the sole means of attachment between the tubes and the firebox sheets. But I do not regard such anchorages as sufficient in the case of a locomotive boiler which, as is well known, carries a high pressure of steam and is subjected to very sudden changes of temperature and to many other shocks and strains not incurred in stationary boiler practice.

Therefore, as a standard measure of safety I initially make the flanges, $a$ and $b$, wide enough to accommodate the ends of a number of stay bolts and place such bolts therein. These bolts, as best indicated at points, $e$, in Figs. 1 and 2, are quite closely spaced in the flanges of the tube. They may be of any desired type; either solid, hollow or flexible; and serve to positively and unyieldingly tie the tube flanges to the opposed sections of the boiler shell. It will be found that the best practice is to weld the tube flanges in place before boring the holes and placing the stay bolts; that is, before the stay bolts are fastened in place.

The stay bolts, e, directly sustain or support the water-circulating tubes; and also perform the usual function with respect to the fire sheets, inasmuch as they are secured in the flanges, a and b, which have become integral parts of said sheets.

The distribution or spacing of the ordinary stay-bolts, 8, is interferred with only at the points occupied by the nests of bolts, e, belonging to the several water heating and circulating elements or tubes.

When tapered tubes are avaliable, they may be substituted for the tubes of uniform cross-section; being flanged, welded and stay-bolted in the same manner. In the case of a tapered tube, the large end will be placed uppermost, to permit an advantageous expansion of the water as it is heated and a freer rise of the steam bubbles generated in the tube.

In Figs. 3 to 12, inclusive, I have depicted numerous exemplary and novel applications of my invention, and also numerous forms of the fire arches or baffles, made possible thereby and which I have devised as peculiarly appropriate thereto.

Figs. 3 and 4 illustrate my invention as applied to water-circulating arch tubes, 14, that are arranged longitudinally in the firebox, 15. By reason of the described manner in which the ends of the tubes are fastened or built into the walls of the firebox, it becomes possible to make these tubes as large as six to eight inches in diameter. The force of this statement will be appreciated when it is recalled that the area of a six-inch tube is four times as large as that of the three-inch arch tube, which is commonly used; hence in making it possible to employ tubes of the large dimensions I have at the same time provided for an enormous amplification of circulation from the lower to the upper parts of the boiler, as between the throat, 16, of the boiler and the rear water leg, 17, thereof. There may be several of these tubes, 14. In fireboxes of medium width it is sufficient to use either two or three thereof, making them of large size to afford the active and copious circulation sought. The refractory arch, 18, is composed of bricks which rest upon the tubes, 14.

Figs. 5 and 6 illustrate the application of my invention to a Wootten boiler, with its combustion-chamber type of firebox, 19. The chief point to be noted is that the water circulating arch tubes, 20, may have their lower flanges welded to the throat sheet, 21, and their upper flanges to the crown sheet, 22. It is entirely feasible to form the lower end flange in the manner here depicted and, obviously, the welding and stay-bolting of such irregular flanges is no more difficult in this case than in the other. I regard it as peculiarly important that my invention makes it possible to have the arch tubes open through the crown sheet of the firebox, as distinguished from the usual practice of having them open through the rear or door-sheet thereof. It is to be noted that this (my preferred practice) has the effect of increasing the pitch and height of the column ascending within the tube; and the forcible delivery of the stream upward through the crown sheet not only facilitates the return flow of the water toward the front end of the boiler, but also insures the constant washing and cleaning of the crown sheet of the firebox. If thought desirable, my arch tubes may occupy positions such as indicated by the dotted lines, 20ª, of Fig. 5.

Fig. 7 depicts a firebox, 24, which is equipped with a plurality of my integrally united and stay-bolted tubes, 25, all of which deliver their contents upon the top of the crown sheet, 26. The arch, 27, whether of the solid or perforated type, is very safely lodged upon the tubes, 25. The construction shown in Fig. 7 is that which I prefer for the majority of locomotive boilers. Before leaving the description of Fig. 7, I wish to call attention to the very desirable circulating and heating effects which I secure by the addition of rear-end circulating tubes, 28, which lead from the lower part of the door sheet and deliver the water upon the top of the crown sheet.

In cases where a very large increment of heating area is desired, I equip the firebox in the manner indicated in Figs. 8 and 9;— i. e., with a considerable number of large tubes, 29, which may connect the lower parts of the water legs, S', with the space, S, above the crown sheet.

My invention comprehends many similar arrangements of these stay-bolted tubes; in various positions within the firebox; both for heating and circulating purposes; and for the support of arch bricks. Figs. 3 to 9 sufficiently indicate this fact and I deem it unnecessary to describe the many other arrangements of the tubes and arches which my invention makes possible. However, there is one further typical arrangement to which I will refer. It is illustrated in Figs. 10, 11, and 12. In Fig. 10, 30, 30, represent large tubes flanged, welded, and stay-bolted in the manner previously described and which extend from low points on the side sheets, or from the throat sheet, to the crown sheet; or to the rear sheet of the firebox, if thought desirable. To each tube, 30, I connect one or more riser tubes, 31; flanging and welding the lower ends thereof to the top of the tube, 30, and flanging, welding and stay-bolting the upper ends in the crown sheet, in the manner before detailed. Large circulating tubes of this character and arrangement are adequate to the support of a very large mass of refractory material and in particular lend themselves to the support of an arch, 32, of the peculiar configuration shown in Fig. 10. An arch of this kind, either solid or perforated, possesses many advantages, the more prominent of which are the well-defined combustion space, 33, directly beneath the crown sheet; the combustion space, 34, in front of the arch, and the deep firing space beneath that portion of the arch which is directly above the grate.

Fig. 12 shows an embodiment of the same generic idea but in a slightly different form, peculiarly suited to shallow fireboxes. This I employ in connection with a substantially right-angled refractory arch construction, 35, which affords many advantages, including the well-defined combustion space, 36, adjacent the flue sheet, 37.

At the present time acetylene welding has attained only a qualified acceptance in locomotive firebox practice, and electric welding has met with even less approval. Nevertheless, I look forward to the time when the welding art will have been perfected to a point that will make possible the initial welding of flanges to my water circulating tubes, and which welded flanges may prove to be almost as efficient as the integral flanges which I have described. With this in view, I have illustrated several plans upon which the welding of the flanges may be undertaken. Thus, as shown in Fig. 13, it may be acceptable to first slightly upset the end, 38, of a water-circulating tube, and then attach the flange, 39, as by a weld, 40, leaving an edge, 39', to be welded in the fire sheet. Another method is shown in Fig. 14, wherein the circulating tube, 41, is shown to be both flanged (42) and welded (43) within the main tube flange, 44. Or as shown in Fig. 15, the main flange, 45, may have a sleeve, 46, serving as a bushing to which the end of the tube, 47, is welded. It will be noted that the main flange may be curved (as in the case of the flange, 39, in Fig. 13) but generally it will be found that it is quite impossible to acceptably weld flanges to the tubes and at the same time maintain both the necessary thinness of metal and the generous curves between the same and the tube, as required to insure a proper resilience and a due degree of safety and durability.

Various modifications of my invention will readily suggest themselves to one who is skilled in the art, and therefore I do not restrict the same to the specific structures herein shown and described, except as defined by the appended claims.

Having thus described my invention, I claim as new and desire to secure by Letters Patent:—

1. A locomotive boiler shell and its firebox, the latter having metal walls which contain openings for a water-circulating element, in combination with a water-circulating element comprising a metal tube of less diameter than said openings, but having outwardly flaring end flanges which fit said openings, the edges of said flanges being welded to the firebox walls at the edges of respective openings therein, and a plurality of stay bolts secured in each said flange and thereby tying the ends of the tube to the boiler shell.

2. A boiler shell and its contained fire box, separated by water spaces and said fire box being composed of metal sheets which contain openings for the reception of the ends of a water circulating element and which sheets are suitably stay-bolted to said shell, in combination with the water circulating element having ends which fill respective openings in the fire box sheets, and which are welded to respective sheets, and stay-bolts which in each case directly join the end of the water circulating element to the boiler shell; whereby the duty of supporting the water-circulating element is divided between said shell and said fire box sheets.

In testimony whereof, I have hereunto set my hand this 9th day of February, 1918.

JOHN L. NICHOLSON.